United States Patent [19]

Jarvis

[11] Patent Number: 4,545,765
[45] Date of Patent: Oct. 8, 1985

[54] SCENE SIMULATOR

[75] Inventor: Kevin M. Jarvis, Sussex, England

[73] Assignee: The Singer Company, Binghamton, N.Y.

[21] Appl. No.: 547,531

[22] Filed: Oct. 31, 1983

Related U.S. Application Data

[63] Continuation of Ser. No. 417,795, Sep. 13, 1982, abandoned, and a continuation of Ser. No. 102,706, Dec. 12, 1979, abandoned.

[30] Foreign Application Priority Data

Oct. 25, 1979 [GB] United Kingdom ............... 7937108

[51] Int. Cl.⁴ .............................................. G09B 9/02
[52] U.S. Cl. .................................... 434/43; 358/104
[58] Field of Search ................. 434/25, 26, 34, 41–44; 358/104, 183

[56] References Cited

U.S. PATENT DOCUMENTS 3,479,454 11/1969 Wolff ................................. 358/104
3,585,628 4/1971 Harrison ............................ 340/725
4,107,665 8/1978 Mayer et al. ...................... 273/313
4,209,832 6/1980 Gilham et al. ...................... 434/20

Primary Examiner—Richard C. Pinkham
Assistant Examiner—Leo P. Picard
Attorney, Agent, or Firm—Douglas M. Clarkson; Barry L. Haley

[57] ABSTRACT

In a calligraphic scene display, occulting or masking of information stored in a data base can take place due to occulting surfaces. To determine whether occulting occurs for any given data item, a comparison is made first with data held in a surface memory circuit (34) indicating generally the area occupied by the surface. When occulting is indicated, a more detailed check is made against data held in a line memory circuit (36) and addressed with the aid of an address held in the surface memory circuit. If the line check indicates occulting, the occult logic (50) is instructed accordingly.

5 Claims, 6 Drawing Figures

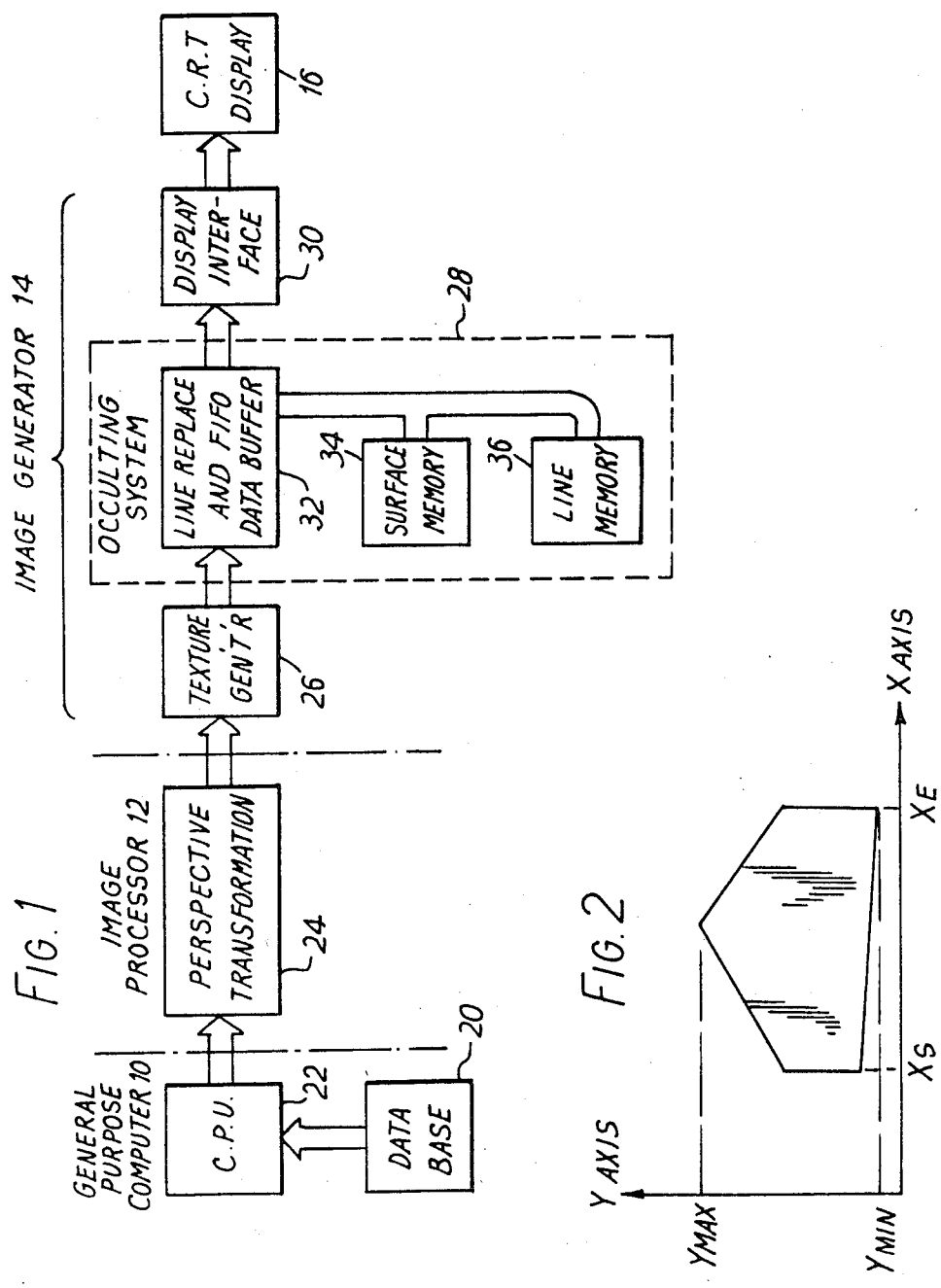

SCENE SIMULATOR

This is a continuation of application Ser. No. 417,795, filed Sept. 13, 1982, now abandoned, and a continuation of Ser. No. 102,706, filed Dec. 17, 1979, now abandoned.

BACKGROUND OF THE INVENTION

1. Field of the Invention

This invention relates to a simulator for providing a visual display, particularly to a night-time or dusk scene. The invention has particular utility in the context of aircraft training simulators, but it could be used for other purposes.

In the training of a pilot to land an aircraft at night on an airfield by the use of a simulator, it is important to provide a display of the airfield lights situated in their correct positions. The more realistic the display can be made, the better is the training provided by the simulator. For this purpose it is desired to display the effects of buildings and hills and to provide a "horizon glow".

In real life, of course, some of these features can obscure others, depending on the precise viewpoing of the observer at any instant, and for example where a building stands in front of a light, it is undesirable for the display to show the light apparently shining through the solid building.

It is desirable, therefore, to eliminate the light from the display, i.e., to occult it.

2. The Prior Art

In an aircraft simulator, such a display is provided by a cathode ray tube (CRT) visual display unit (VDU) which is controlled by a computer. The data base containing all the positional data of the features to be displayed customarily is stored in a general purpose computer, which also selects the required data to be displayed in any given scene. A perspective transformation then is carried out on the data in a specially arranged unit. Finally, another specially arranged unit provides image generation from the transformed data. Such equipment is known already.

One arrangement suggested is to use the general purpose computer to calculate whether or not any given string of lights is behind an object, when it is, and to prevent its transfer to the perspective transformation unit. This is believed to be unrealistic because only complete strings of lights and surfaces can be eliminated from the scene. Further, the software necessary to perform the perspective view in the scene is very complex, and therefore, a very powerful computer is required.

In another arrangement, the display provides a raster display; that is, the scene is built up by scanning lines in the manner that a television picture is developed. Each raster is added to a large memory in the image generation system. Such memory, therefore, provides a memory location for every element of the display. Subsequent features are checked against this memory for coincidence with a previously memorized area.

This last-described arrangement overcomes some of the problems that have been experienced and is effective for surfaces, e.g., buildings, providing certain range ordering rules are adhered to. However, it is necessary for all light points to lie behind all the occulting surfaces, so that only one level of occulting exists for light points. Even so, the size of the memory required is very large, e.g., for one thousand line resolution, one million bits of storage would be needed.

Another disadvantage of this last-described arrangement is that it is based on a raster scan, which does not provide the best form of display. It is desirable to provide surfaces with a texture, and this is best achieved using a calligraphic display, in which surface areas are built up by close lines which are oriented in whatever is the best orientation for that surface. For example, for buildings and horizon glow, this may be vertical, while for the runway, the lines may converge at a distant point.

SUMMARY OF THE INVENTION

It is an object of the invention to provide a system capable of occulting points of light, such as along a runway for landing an aircraft at night, and which system is adapted for use in a calligraphic display.

The system of the invention is particularly for use in an aircraft simulator to perform realistic modelling of objects such as airport buildings, chimneys, skyscrapers, and other aircraft hazards, onto airport scenes and to display also city outlines, hills, and mountain ranges and also airport, runway and other lighting. The features displayed are grouped into the following two categories, namely (a) lights and horizon glow, and (b) buildings and hills. The system of the invention is uniquely adapted to produce night-time or dusk scenes.

According to the invention, a simulator has means to generate a visual display of a scene, wherein the scene includes surfaces which are simulated by means of a plurality of lines, and at least some of the surfaces may occult other features of the scene. The simulator of the invention has a plurality of line memory locations for storing data on individual lines which make up a surface that could cause occulting. Some of the surface memory locations for storing data provide an indication of the area occupied by the surface and an address associated therewith to identify the position of the related individual lines in the line memory locations. Comparison means compares each incoming feature successively with the data in the surface memory locations, and if the possibility of occulting is indicated, then it compares the incoming feature with the corresponding data in the line memory locations to determine whether occulting of the feature should take place.

Such a simulator could be used with a raster scan; however, it lends itself particularly for use with a calligraphic scan.

THE DRAWINGS

The invention will now be described in more detail, by way of example, with reference to the drawings, in which, FIG. 1 is a block diagram of one example of a scene simulator;

FIG. 2 shows an occulting surface;

THE PREFERRED EMBODIMENT

Figure 3:
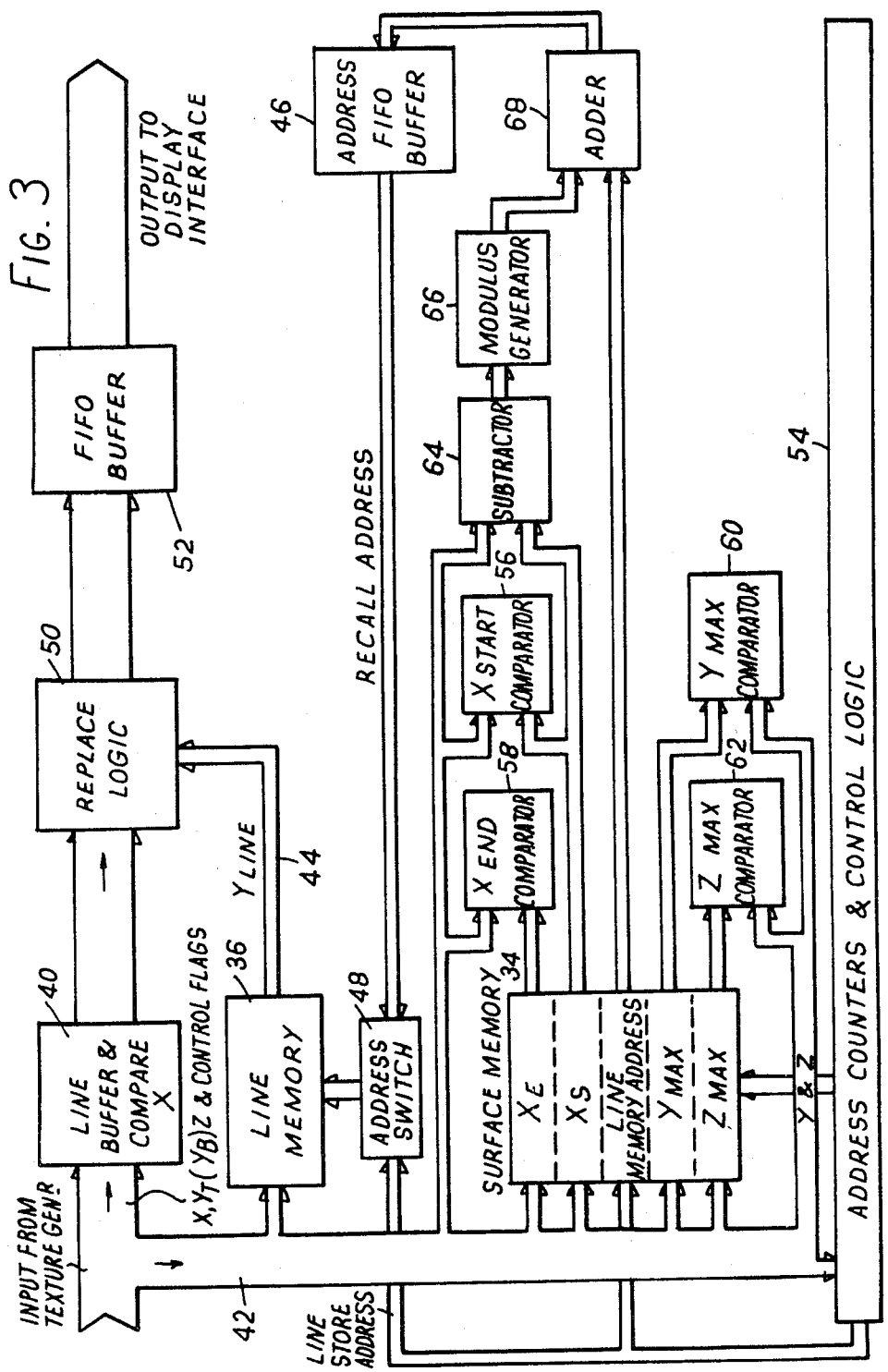
FIG. 3 is a block diagram of the occulting system used in the simulator.

Referring now to FIG. 1, the relevant parts of a scene display simulator are shown in block form. The principal elements are a general purpose computer 10, an image processor 12, and an image generator 14, the output of which is applied to a CRT display 16.

The general purpose computer 10 includes principally a data base 20 and a central processing unit (CPU)

22. Full information of every feature to be displayed is contained in the data base 20, i.e., its full coordinates on a map, its height at each coordinate, its texture if a surface, or its color and power if a light.

The data base also contains general information about the ground contour and the horizon glow. When the direction from which a scene is to be viewed and orientation with which a scene is to be viewed are known, the CPU analyzes the data on an isometric basis to generate coordinates for each feature in the X and Y planes of the scene, coupled with the range from an observer's plane. This information is transferred to the image processor 12 which consists of a perspective transformation unit 24, which converts the isometrically based coordinates to perspective coordinates in a two-dimensional plane.

The output of the perspective transformation unit 24 is applied to the image generator 14, which includes a texture generator 26, an occulting system 28 and a display interface 30 which feeds the CRT display 16. The texture generator 26 converts basic texture information associated with each area, namely direction and intensity to scan, to full line-by-line information giving the start and end of each of the component lines making up the texture. After occulting in the occulting system 28, the data interface 30 feeds the information line-by-line to the CRT display 16.

With the exception of the occulting system 28, the apparatus shown in FIG. 1 are well known, and therefore, a detailed description is unnecessary.

The occulting system 28, however, includes three principal components. These are what may be termed a line replace and FIFO (first in, first out) data buffer unit 32, a surface memory circuit 34, and a line memory circuit.

In the unit 32, light points are eliminated and texture scan lines altered, according to the occulting requirements.

As noted above, the data base includes surfaces which represent hills and buildings which will occult other surfaces, lights, and horizon glow which are behind them. The surfaces may be textured, i.e., defined by a plurality of colored lines, or they may be non-textured in which case the lines are black.

The groups of lines representing each surface which could cause occulting are stored as individual "masks" in the occulting system 28. In the system 28, all masking surfaces are formed by vertical lines. Each surface then is formed as a block of lines.

Each line, on the other hand, is adequately defined by knowing the horizontal position X of the line and the position of the top point of the line, this point being termed $Y_T$, since the bottom of the line is defined by the ground level which is stored in the data base. However, the vertical position $Y_B$ of the bottom of the line can be stored for each line, if desired.

These blocks of lines are stored in successive locations in the line memory 36 in the occulting system 28.

A typical occulting surface is shown in FIG. 2 of the drawings. Associated with the surface as a whole, there are the following coordinates:

(i) the maximum value $Y_{MAX}$ of the top points $Y_T$ of the lines occurring in the surface;
(ii) the horizontal coordinate $X_S$ at the start, which may be the left-hand or the right-hand edge of the surface;
(iii) the horizontal coordinate $X_E$ at the end, i.e., the opposite edge to $X_S$ of the surface; and
(iv) the maximum value $Z_{MAX}$ of the ranges Z of the lines of the surface from the observers' point of view.

In the surface memory circuit 34, there is one memory location for each surface. The maximum permitted number of surfaces is set at a suitable value depending on requirements; the values of 16 and 64 have been considered. Each memory location in the surface memory, therefore, stores the above parameters (i) to (iv), plus the address in the line memory 36 of the first line $X_S$ of the surface.

If values of $Y_B$ are stored in the line memory, it is convenient also to store in the surface memory circuit 34 the minimum value $Y_{MIN}$ of $Y_B$. Otherwise this value, if required, can be calculated from a knowledge of the range Z, the ground level information being stored in the data base.

It will be appreciated from the above that the line memory circuit 36 must have sufficient locations to hold data relating to the maximum total number of lines that will occur in all of the occulting surfaces. In the system of the invention, there are 4096 locations, which are found to be adequate in practice, giving four times the width of the display in total mask coverage. For the surface memory circuit 34, only one location for each surface is required. This memory, therefore, is comparatively small, being 5 or 6 times 16 words, so as to enable 16 surfaces to be stored.

The occulting system 28 is shown in more detail in FIG. 3 of the drawings. The occulting system 28 operates in two phases, first, a loading phase in which the surface and line memory circuits 34 and 36 are loaded with information relating to surfaces which may cause occulting, and second, an operational phase in which incoming lines are checked to see if they need to be occulted. The two phases will be described with the assistance of the flow charts of FIGS. 4 to 6, of which FIG. 4 relates to the loading phase and FIGS. 5 and 6 to the operational phase.

Referring first to FIG. 3, lines received from the texture generator are applied to a line buffer store 40. Also, the line memory circuit 36 and surface memory circuit 34 are connected to the input bus 42, the operation of which is under the control of control logic 54. For each line, the input data consists of X, $Y_T$ and Z, and, possibly also, $Y_B$.

Control flags indicate which is the start line and which is the end line of a surface and, also, whether the surface is textured. During the operational phase control flags distinguish light points from other surfaces and give their color and power.

In the loading phase, the values of $X_E$, $X_S$, $Y_{MAX}$ and $Z_{MAX}$, for each surface which could cause occulting, are loaded into the surface memory circuit 34. The line memory circuit 36 contains, in a block, at least the $Y_T$ values of all the lines making up this surface, and the address in the line memory of the first line ($X_S$) of this block is held also in the surface memory circuit 34.

Associated with the surface memory circuit 34 are four comparators 56, 58, 60, and 62, connected respectively to the $X_S$, $X_E$, $Y_{MAX}$ and $Z_{MAX}$ locations and, also, to receive the corresponding X, Y and Z input data. A subtractor 64 is connected to the X data input and to the $X_S$ store location to provide a count indicative of the number of lines by which the current input line is spaced away from the start line $X_S$ of the surface.

A modulus generator 66 generates the modulus of this difference and adds it in an adder 68 to the line memory address of $X_S$ as held in the surface memory circuit 34. The resultant address can be applied through a buffer 46 and through an address switch 48 to read from the line memory circuit 36 into an occulting and replace logic 50, where input lines are occulted selectively. The output of the block 50 is applied through a buffer 52 to the display interface 30.

Figure 4:
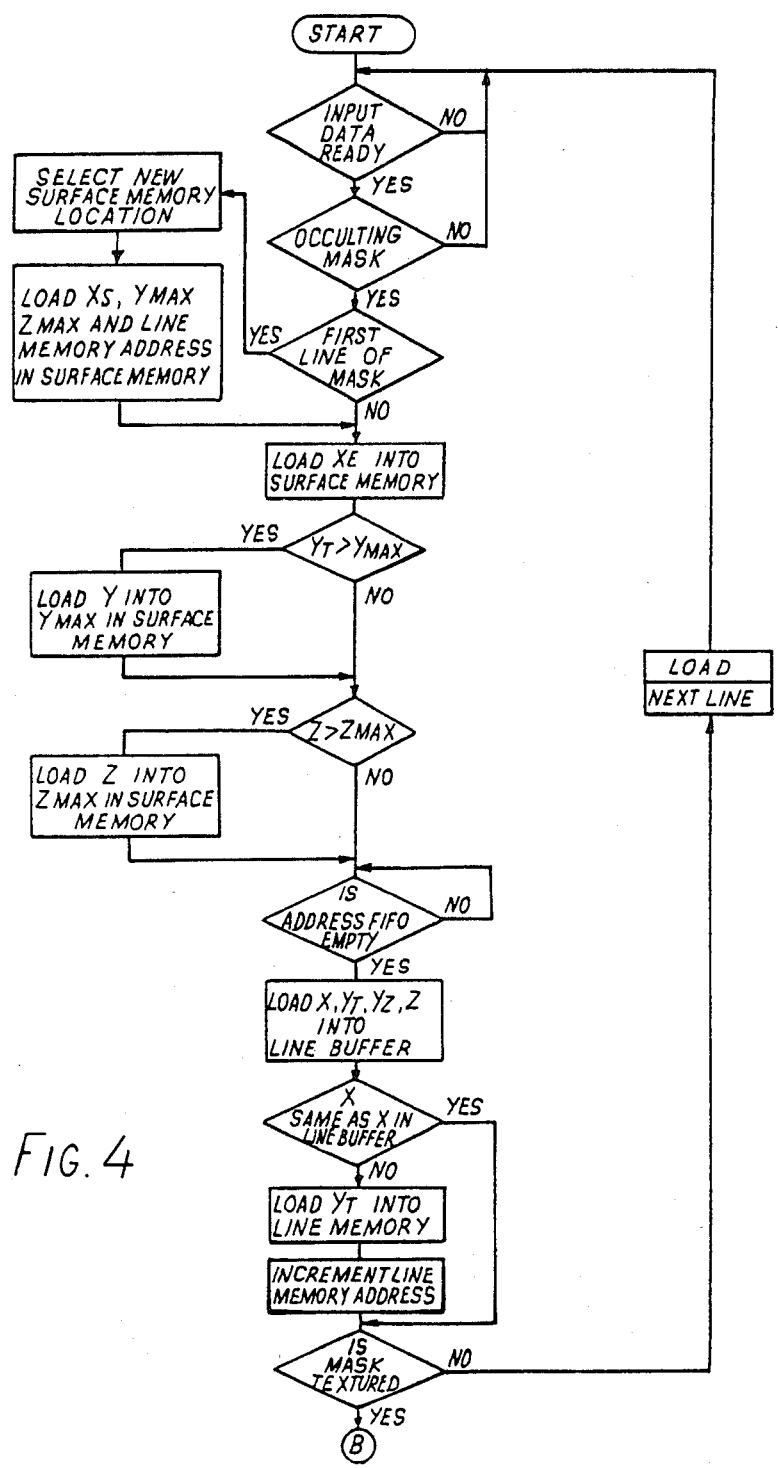
FIGS. 4, 5 and 6 are logic diagrams illustrating the operation of the occulting system.

The loading phase will be described with reference to FIGS. 3 and 4. The surfaces which can cause occulting are read from the data base 20. For each possibly occulting surface, the control logic 54 checks that the data is ready first and that the surface is of a type which could cause occulting.

If the incoming line is the start line $X_S$ of a new surface, then a new location is found in the surface memory circuit 34, and the value of $X_S$ is loaded into the $X_S$ location. The values of $Y_T$ and Z for this line are loaded into the $Y_{max}$ and $Z_{MAX}$ locations.

For this line and for all subsequent lines, the value of X is loaded into $X_E$, so that when all of the lines of the surface have been considered, the $X_E$ location really does contain $X_E$. For subsequent lines of the surface, the comparator 60 compares the value of $Y_T$ for the input line with the value stored in the $Y_{MAX}$ location and writes the greater of these values into the $Y_{MAX}$ location of the store 34.

Similarly, the comparator 62 compares the value of Z for the line with the value stored in the $Z_{MAX}$ location and writes the greater of these values into the $Z_{MAX}$ location of the store. When all of the lines of the surface have been processed, the $Y_{MAX}$ and $Z_{MAX}$ locations will contain, respectively, the maximum values of $Y_T$ and Z for the lines of that surface. The X, $Y_T$, $Y_B$ and Z values are loaded into the line buffer, which is the next stage of the data pipeline.

The input X for the line is compared now with the X value stored in the line buffer 40 to ensure that two lines of equal X-position are not stored in the line memory circuit 36. If these two line numbers are different, then the value of $Y_T$ is stored in the line memory circuit 36 at the next unused address, and in this instance, the address register is incremented by one. If the mask is textured, this information is used in the operational phase, (FIGS. 5 and 6); otherwise, the next line is read immediately.

During the operational phase the lines received from the texture generator are checked against the stored information of occulting features, such as buildings and hills. This checking takes place in two stages: first, a surface check, and if this is positive, then a line check.

Figure 5:
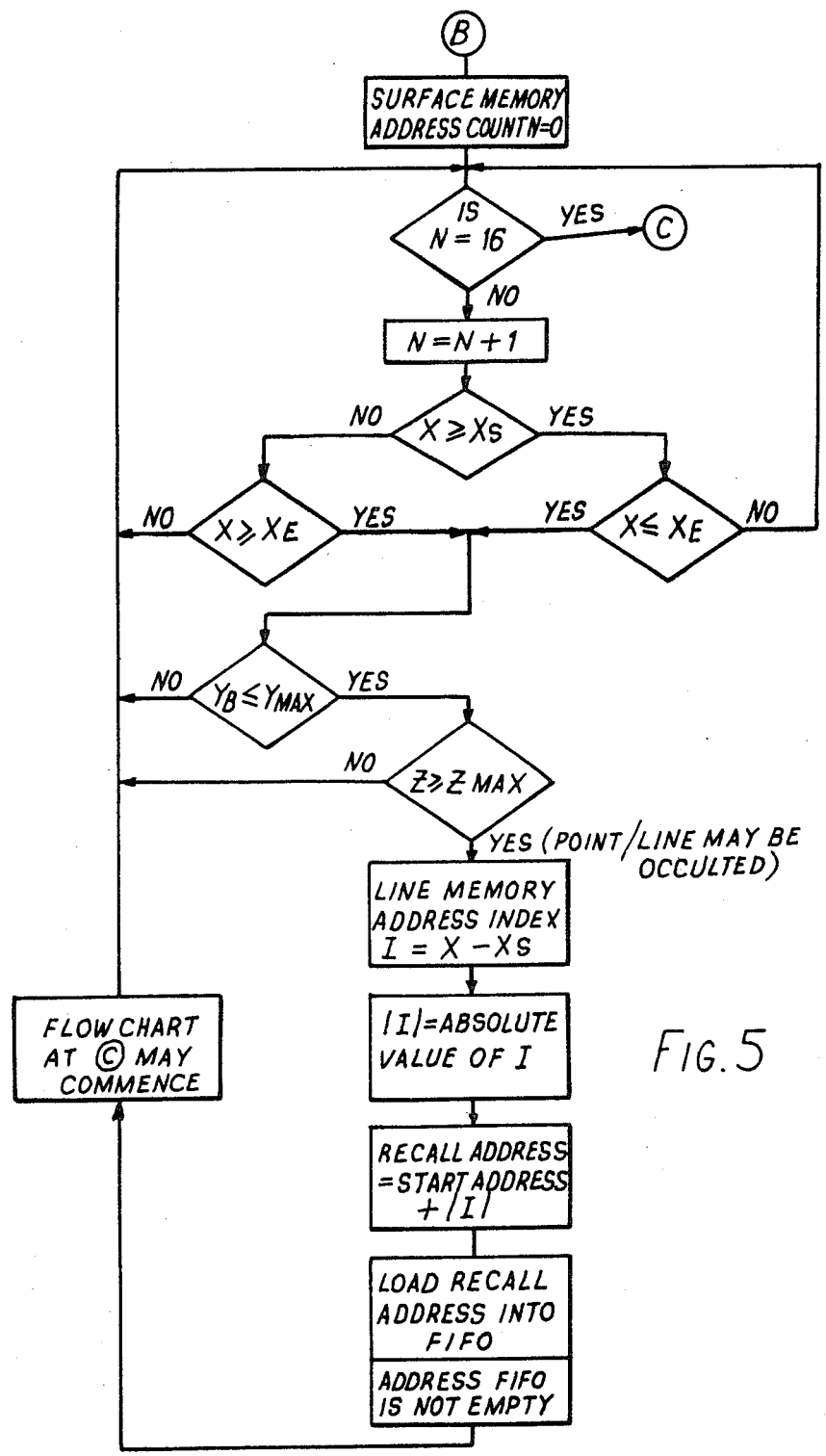

Referring in FIG. 5, the logic steps start at point B. A surface memory address counter in logic 54 is set to zero first. For the incoming line, a check is made by means of comparators 56 and 58 against the values of $X_S$ and $X_E$ stored in the surface memory circuit 34.

If X is less than both $X_S$ and $X_E$ or if X is greater than both $X_S$ and $X_E$, no further checking takes place with this line against this surface or mask. If the surface address count is less than 16, it is incremented by one, and the next surface taken. For points of light, the Y coordinate is equal to $Y_B$ and $Y_T$ which can be treated as zero length lure.

Next, a check is made in the comparator 60 as to whether the lower end of the line, defined by $Y_B$, is less than, or is equal to, $Y_{MAX}$, and if not, again the next surface is taken. $Y_B$ is included in the input data. It has now been determined that part of the line (or point) at least extends into the rectangle, defined on FIG. 2 by the values of $X_S$, $X_E$ and $Y_{MAX}$ and the X axis.

Next, the value of Z of the range for the input line is compared with $Z_{MAX}$ in comparator 62, and if this shows that the input line (or point) lies behind the surface, then it is clear that the line (or point) is to be occulted, subject to the actual shape of the surface as defined by the lines in the line memory circuit 36. The subtractor 64, modulus generator 66 and adder 68 now operate to generate a recall address for use by the line memory addressing circuitry, which is stored in an address buffer 46. The line is tested against the next and the subsequent stored surfaces.

The position in the line memory circuit 36 of the line in the occulting surface in the direct line-of-sight to the line (or point) being checked is calculated in three operations:

(1) The subtractor 64 determines the distance in the 'x' axis of the object line (or point) to the start of the occulting surface. It is important to note that this measure is in units of line width as stored in the line memory. Therefore, the need for the 'x' compare in the line buffer is to ensure that each line is stored at an equal increment, i.e., the line width unit.

(2) If the result of step (1) is negative (the surface may be viewed from either side), a modulus generator 66 gives the absolute, positive value of 'line width units' from the start of the occulting surface.

(3) This index then, is added to the START ADDRESS of the particular mask to form the complete address of the occulting element of the mask. The complete address is stored temporarily in the FIFO buffer 46, and a flag is raised in the control logic to say that the ADDRESS FIFO (46) is NOT EMPTY.

If the check against the surface memory circuit 34 recalls that the input line does not lie in a position where it could possibly be occulted, then further processing is avoided, and the line is passed without modification by replace logic 50 to the FIFO buffer store 52 at the output of the unit 28.

Figure 6:
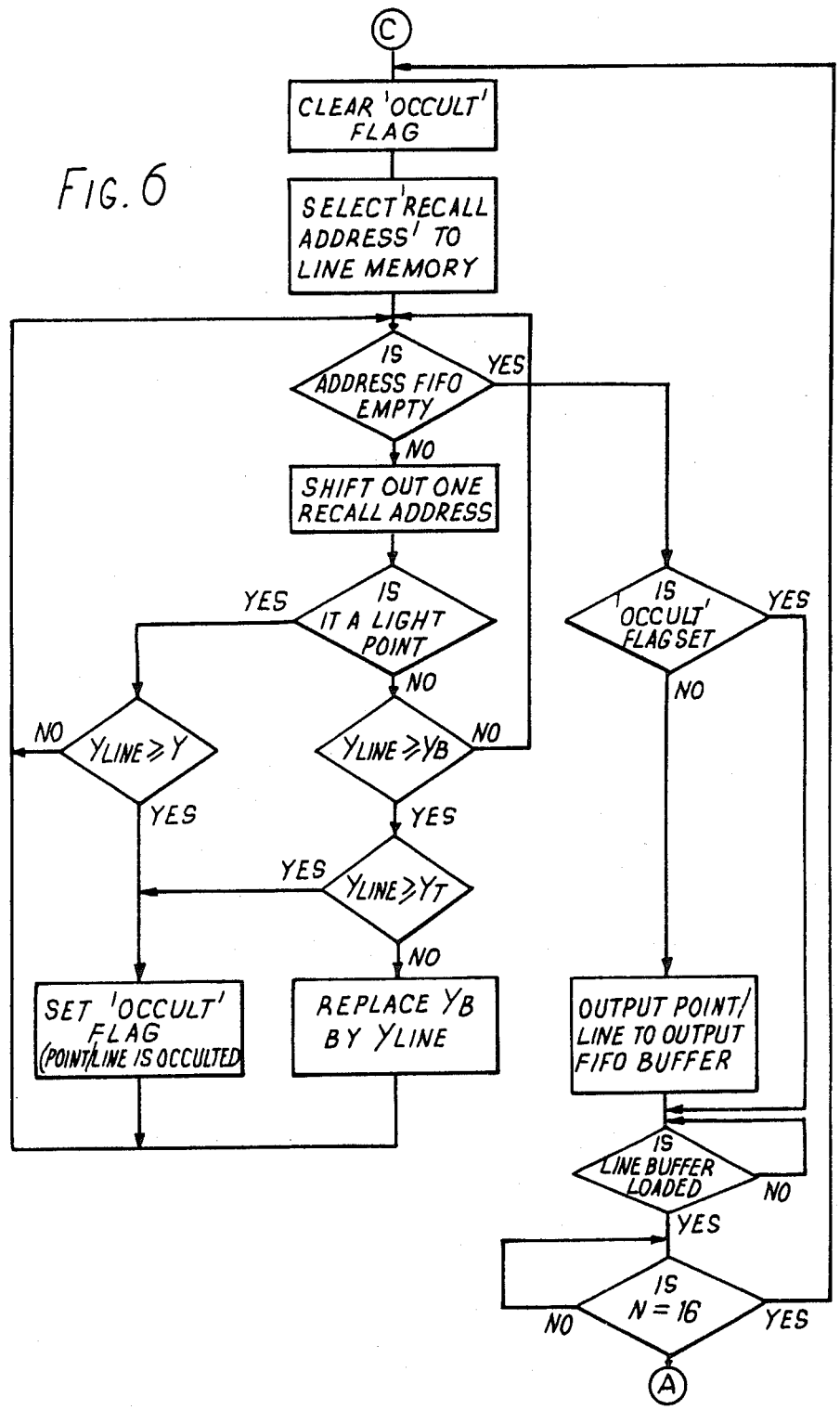

However, for the lines for which addresses are stored in the buffer 46, a line check is carried out. Reference is made to FIG. 6 which illustrates this processing.

Any "occult" flag in the control logic 54 is cleared first, and the next address is read out of the address buffer 46. If the input data is flagged to indicate that it is a light point, the only test is whether the value of $Y_T$, or simply Y, ($Y_T$ and $Y_B$=Y for light points) for the light point is greater than the value of $Y_T$ for the stored line, now termed $Y_{LINE}$. If it is greater, it will not be occulted, and if it is not greater, the point will be occulted, and the occult flag is set.

If it is not a light point, two tests are carried out on the input line. If $Y_B$ is greater than $Y_{LINE}$, no occulting can take place. If $Y_T$ is less than $Y_{LINE}$, the entire line is occulted. In either event the treatment is the same as for a light point.

If $Y_{LINE}$ lies between $Y_T$ and $Y_B$, then partial occulting of the line occurs, and the value of $Y_{LINE}$ is substituted for the value of $Y_B$ so as to shorten the line. This Y value is applied to the replace logic 50 by a bus 44. It should be noted that these coordinates may be modified further by successive occulting lines from different surfaces.

If, when the address buffer 46 is empty, the occult flag is set, then the line (or point) is not transferred, and control is resumed on the next cycle. Otherwise, the cycle line or point, possibly modified in respect of $Y_B$, is connected to the buffer 52.

It should be noted that the logic of FIG. 6 can be initiated as soon as there is an address stored in the address buffer 46, so that line checks against lines of a first surface can be made while surface checks against subsequent surfaces are still being carried out.

The use of separate surface and line memories in the manner described provides a dramatic reduction in the storage requirement, while improving the quality of the display. While the description has been in terms of a calligraphic display, a raster display could be used, if desired.

In view of this detailed description, other and further modifications, variations, advantages and uses will occur to one skilled in this art. Accordingly, the description is to be considered as illustrative only, the scope of the invention being defined by the appended claims.

I claim:

1. In a training apparatus in which an operator can gain experience in the performance of a predetermined task without the cost and without the risk that is inherent in the performance of the task in the real world, the training apparatus including a computer generated video visual display of a predetermined scene composed of features, lines and surfaces, and some of the surfaces may occult other features in the scene, the image generator comprising:

general purpose computer means including a central processing unit and a data base for containing information on every feature to be displayed;

general processor means including a perspective transformation means to convert isometric coordinates to perspective coordinates connected at the output of said computer means;

image generator means connected to receive an output signal from said perspective transformation means and including a texture generator, an occulting system, and a display interface means;

said occulting system including data buffer means, a line memory circuit, and a separate surface memory circuit;

said line memory circuit having sufficient locations to store data at locations relating to the maximum number of lines occurring in all occulting surfaces;

said surface memory circuit having one memory location for each surface, each memory location storing horizontal start and end points of said surface, maximum value to observer, and maximum value of top points of said surface; and means for comparing data of each incoming feature successively with data stored in surface memory locations to determine whether the possibility of occulting is indicated, so that said data of an incoming feature is connected into said data buffer means, when no occulting is indicated, for connection to said display interface means.

2. In a training apparatus according to claim 1 wherein said means for comparing data includes comparator circuit means for comparing the X axis line position of an incoming feature with the $X_{START}$ and the $X_{END}$ data stored in said surface memory locations.

3. In a training apparatus according to claim 1 wherein said means for comparing data includes at least four comparator circuit means, one for $X_{START}$ data, one for $X_{END}$ data, one for $Y_{MAX}$ data, and one for $Z_{MAX}$ data.

4. In a training apparatus according to claim 1, in which the occulting surfaces are made up of vertical lines.

5. In a training apparatus according to claim 4, in which the extent of each line is defined by its height ($Y_T$) and by stored data representative of the ground level.

* * * * *